(12) United States Patent
Wang et al.

(10) Patent No.: US 10,372,683 B1
(45) Date of Patent: Aug. 6, 2019

(54) METHOD TO DETERMINE A BASE FILE RELATIONSHIP BETWEEN A CURRENT GENERATION OF FILES AND A LAST REPLICATED GENERATION OF FILES

(71) Applicant: EMC Corporation, Hopkinton, MA (US)

(72) Inventors: Xuan Wang, Newark, CA (US); Bhimsen Bhanjois, Fremont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 585 days.

(21) Appl. No.: 15/083,958

(22) Filed: Mar. 29, 2016

(51) Int. Cl.
*G06F 17/30* (2006.01)
*G06F 16/178* (2019.01)
*G06F 16/11* (2019.01)

(52) U.S. Cl.
CPC .......... *G06F 16/178* (2019.01); *G06F 16/125* (2019.01)

(58) Field of Classification Search
CPC ......... G06F 17/30159; G06F 17/30174; G06F 17/30088; G06F 17/30182; G06F 17/30212; G06F 11/1451; G06F 11/1456; G06F 11/1469; G06F 11/1471; G06F 11/1464; G06F 11/1458
USPC .......................................... 707/686; 711/162
See application file for complete search history.

(56) References Cited

U.S. PATENT DOCUMENTS

| | | | | |
|---|---|---|---|---|
| 7,320,009 B1* | 1/2008 | Srivastava | .......... | G06F 16/1844 707/625 |
| 7,882,064 B2* | 2/2011 | Lee | ...................... | G06F 16/184 707/625 |
| 8,442,952 B1* | 5/2013 | Armangau | ........ | G06F 17/30159 706/14 |
| 9,547,651 B1* | 1/2017 | Ahmed | ................. | G06F 16/184 |
| 9,934,301 B2* | 4/2018 | Srivastava | .......... | G06F 16/1844 |
| 2008/0010322 A1* | 1/2008 | Lee | ........ | G06F 16/184 |
| 2008/0077629 A1* | 3/2008 | Lorenz | ................. | G06F 3/0608 |
| 2009/0125692 A1* | 5/2009 | Yamamoto | .......... | G06F 11/1451 711/162 |
| 2011/0066594 A1* | 3/2011 | Srivastava | .......... | G06F 16/1844 707/625 |
| 2011/0196838 A1* | 8/2011 | Zunger | ................. | G06F 16/182 707/636 |
| 2013/0031056 A1* | 1/2013 | Srivastava | .......... | G06F 16/1844 707/638 |
| 2013/0124472 A1* | 5/2013 | Srivastava | .......... | G06F 16/1844 707/625 |
| 2014/0351214 A1* | 11/2014 | Abercrombie | .... | G06F 17/30575 707/626 |

* cited by examiner

*Primary Examiner* — Jean M Corrielus
(74) *Attorney, Agent, or Firm* — Womble Bond Dickinson (US) LLP

(57) ABSTRACT

A method for data replication between two file systems is disclosed. A base file relationship between the current generation of files and the last replicated generation may be constructed based on the generation-to-generation base file relationships of the intervening generations. The base file relationship between the current generation of files and the last replicated generation may be utilized in the replication of the current generation of files to the replica file system to reduce the amount of data that needs to be transferred while the files on the replica file system are more than one generation behind the current generation due to network outage or other issues.

21 Claims, 6 Drawing Sheets

METHOD TO DETERMINE A BASE FILE RELATIONSHIP BETWEEN A CURRENT GENERATION OF FILES AND A LAST REPLICATED GENERATION OF FILES

FIELD OF THE DISCLOSURE

Embodiments of the disclosure relates generally to data backups, and more particularly to systems and methods for replicating data backups.

BACKGROUND OF THE DISCLOSURE

Certain data storage system operations may involve creating a file that is wholly or partly a clone or other copy of another file. For example, certain snapshot and/or related technologies may involve creating a clone or other copy of a file or set of files.

Data storage systems may be configured to take advantage of the fact that files created by cloning or otherwise copying existing files have, at least initially, a great deal of data in common with the file based on which they were created. Deduplication storage systems, for example, may store each data segment only once, and may for each file that includes a given segment include only a pointer to the single stored instance of the segment.

BRIEF DESCRIPTION OF THE DRAWINGS

Various embodiments of the disclosure are disclosed in the following detailed description and the accompanying drawings.

DETAILED DESCRIPTION

The embodiments can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Establishing file relationships, e.g., generational relationships, based on file operations is disclosed. In various embodiments, file operations, such as file copy, clone, or other file system operations, are monitored. Upon detecting that a file has been created at least in part by copying another file, a base file relationship is determined for the file, and data representing the relationship between the file and its base file is stored persistently. In various embodiments, the stored base file—file relationship data may be used to optimize an operation, such as file replication.

The present disclosure discusses system, methods, and processes for replicating data backups from a source storage system to a destination storage system. Replicating backups between storage systems provides redundancy, which may be beneficial if one of the systems fails. For example, if a backup is stored on two data systems and one of the systems is destroyed, the backup is not lost because it still resides on the second system.

Figure 1:
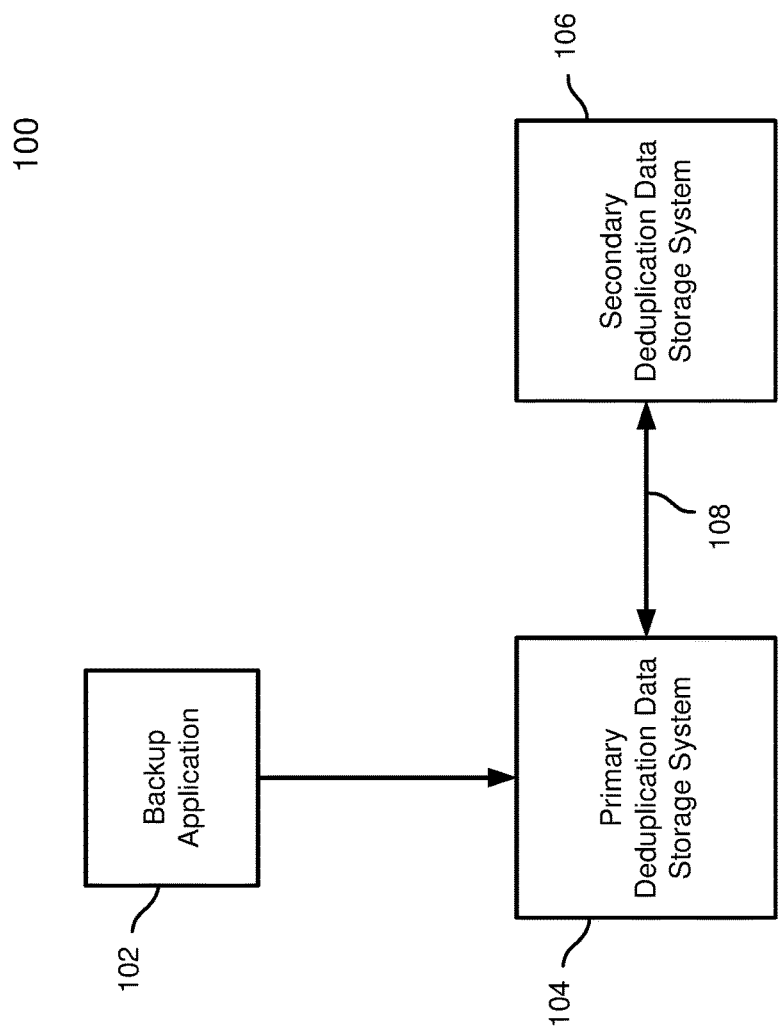
FIG. 1 is a block diagram illustrating an embodiment of a system to establish file relationships based on file operations.

FIG. 1 is a block diagram illustrating an embodiment of a backup system consistent with an embodiment of the disclosure. In the example shown, a backup application 102 provides backup data to a primary data storage system 104. For example, an EMC® Avamar® backup agent, application, appliance, and/or system may provide backup data to a primary data center and/or other location at which primary data storage system 104 is installed. Primary data storage system 104 may comprise a deduplication storage system. In various embodiments, primary deduplication data storage system 104 may comprise an EMC® Data Domain® deduplication storage system. In the example shown, primary deduplication data storage system 104 replicates data to a secondary deduplication data storage system 106 over a wide area network (or other network) 108. Data may be replicated from primary deduplication data storage system 104 to secondary deduplication data storage system 106, for example, to provide disaster recovery protection, e.g., by enabling data backed up by backup application 102 to be recovered from secondary deduplication data storage system 106 if primary deduplication data storage system 104 were to become unavailable.

In various embodiments, replication of data from primary deduplication data storage system 104 to secondary deduplication data storage system 106 over network 108 is performed at least in part by sending from primary deduplication data storage system 104 to secondary deduplication data storage system 106 a set of fingerprints or other data representative of data segments comprising a file, and receiving an indication of which data segments the secondary deduplication data storage system 106 does not already have stored. The missing segments are then sent from primary deduplication data storage system 104 to secondary deduplication data storage system 106 via network 108.

In various embodiments, primary deduplication data storage system 104 is configured to determine a base file relationship between a file that is created at primary deduplication data storage system 104 by making a copy of another file, on the one hand, and a base file with which the newly-created file is associated. In various embodiments, the determination may be based at least in part on a file operation associated with the file, e.g., a file copy operation. In various embodiments, primary deduplication data storage system 104 determines programmatically a base file for the file, and stores persistently data reflecting the generational relationship between the base file and the file. For example, a tuple or other data that associates the base file with the created file may be stored in a table or other data structure. In some embodiments, a base file attribute of an object or other data structure used to hold file metadata may be set to an identifier or other value associated with the base file.

In various embodiments, the persistently stored data indicating the base file relationship may be used to perform a subsequent operation more efficiently, e.g., a replication operation such as described above. For example, in some embodiments, a base file relationship may be used to determine efficiently that certain segments comprising a file have already been replicated to a replication target, e.g., secondary deduplication data storage system 106 in the example shown in FIG. 1. For example, if data segments common to a file and its base file have already been replicated in connection with replication of the base file, for example and without limitation, in some embodiments it may not be necessary to send corresponding fingerprints from the primary deduplication data storage system 104 to the secondary deduplication data storage system 106, for example, since it can be determined based on the base file relationship that the segments common to the file and its base file have already been sent.

Independent files of a common lineage (e.g., different versions of a file) can be replicated from one autonomous file system (e.g., a file system on the primary deduplication data storage system 104 of FIG. 1) to another (e.g., a file system on the secondary deduplication data storage system 106 of FIG. 1) while utilizing base file relationships within the versions of backup files. Data may be added, removed, or edited between different versions of a file. By exploiting the base file relationship between different versions of a file (e.g., between the current version and the previous version), the amount of data that needs to be transferred from the source file system (e.g., a file system on the primary deduplication data storage system 104 of FIG. 1) to the replica files system (e.g., a file system on the secondary deduplication data storage system 106 of FIG. 1) in order to replicate and reconstruct the new version of the file on the replica file system may be reduced or minimized. Generally, each generation of files may be replicated from the source file system to the replica file system. The replica file system may be remote from the source file system, and data may be transferred from the source file system to the replica file system via a network (e.g., network 108 of FIG. 1). If replication is successful at every generation, base file relationships between consecutive generations of files may be utilized directly in the replication process to reduce the amount of data that needs to be transferred because the immediately previous generation of files are known to exist on both the source file system and the replica file system. Common regions of data between the current generation and the previous generation are known from the base file relationship and therefore the transfer of the common regions of data can be avoided.

Figure 2:
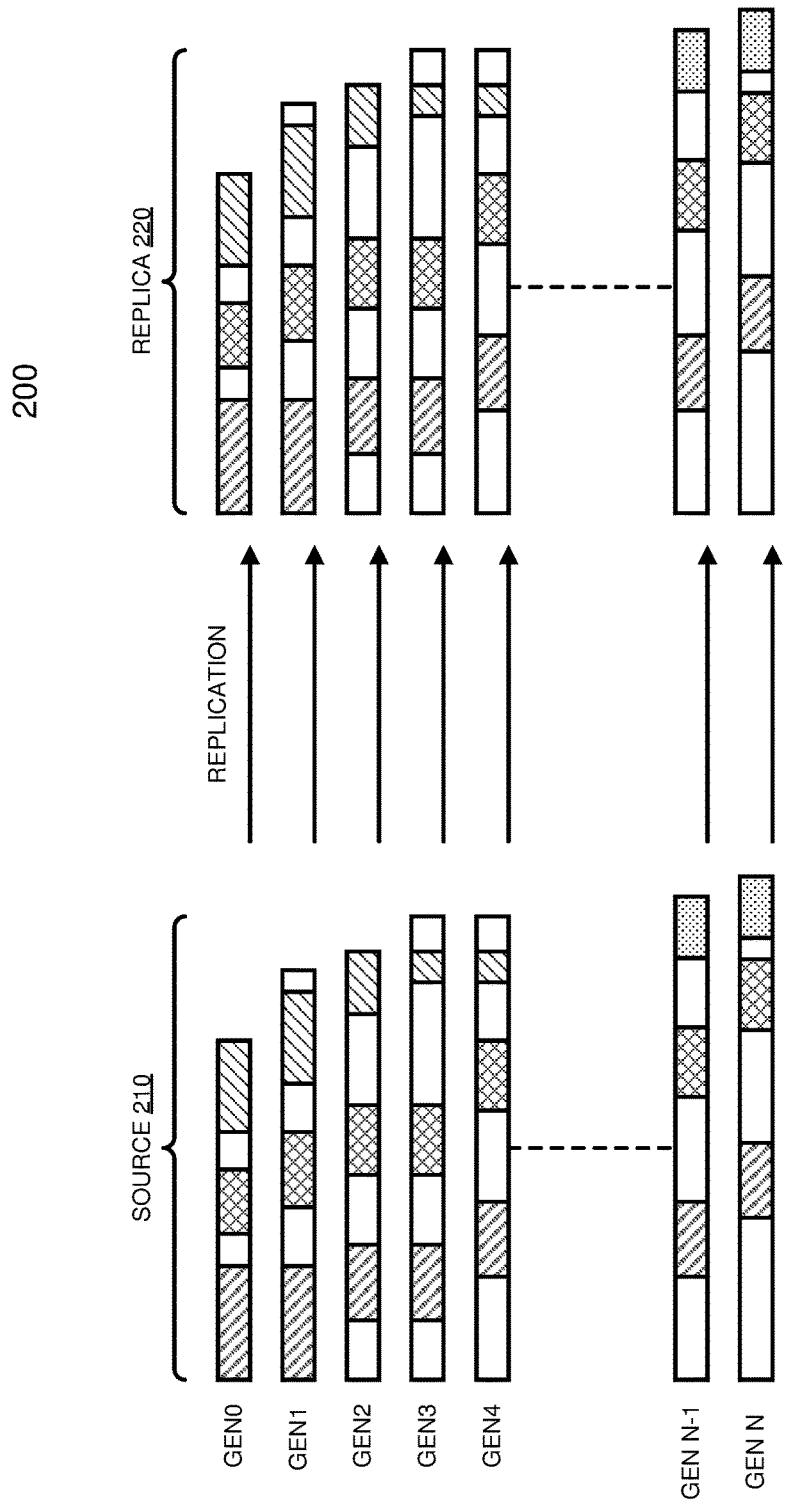
FIG. 2 is a diagram illustrating generation-to-generation replication of files of a common lineage.

Referring to FIG. 2, a diagram 200 illustrating generation-to-generation replication of files of a common lineage is shown. The replication from the source file system 210 to the replica file system 220 is successful at every generation. The very first generation may be referred to as Generation 0 (Gen0); the next generation may be referred to as Generation 1 (Gen1), etc. The current generation may be referred to as Generation N (GenN). One or more files of a common lineage are replicated across the generations. Common regions of data (e.g., inherited data that can be synthesized from data from at least one previous generation) across generations are illustrated with shaded blocks, while the shading style indicates the inheritance relationship. In other words, at any particular generation, data represented by a shaded block may be synthesized from data from at least one previous generation that is represented by a shaded block with the same shading style. It should be appreciated that the offset of the inherited data (e.g., the location of the inherited data within a file) may change between generations. Between two consecutive generations, a file may change (e.g., with data addition, removal, or edit), or may remain the same. As described above, because the replication is successful at every generation, base file relationships between consecutive generations may be utilized directly to reduce the amount of data that needs to be transferred from the source file system 210 to the replica file system 220.

However, issues such as network outage may prevent the replication of one or more generations of files from being successfully completed. By the time the issue is resolved and the replication can resume, files on the source file system may have progressed through multiple generations. Replicating all the intervening generations of files upon the resumption of replication may be impractical and/or unnecessary. Usually only the current (e.g., latest) generation of files are of interest.

Figure 3:
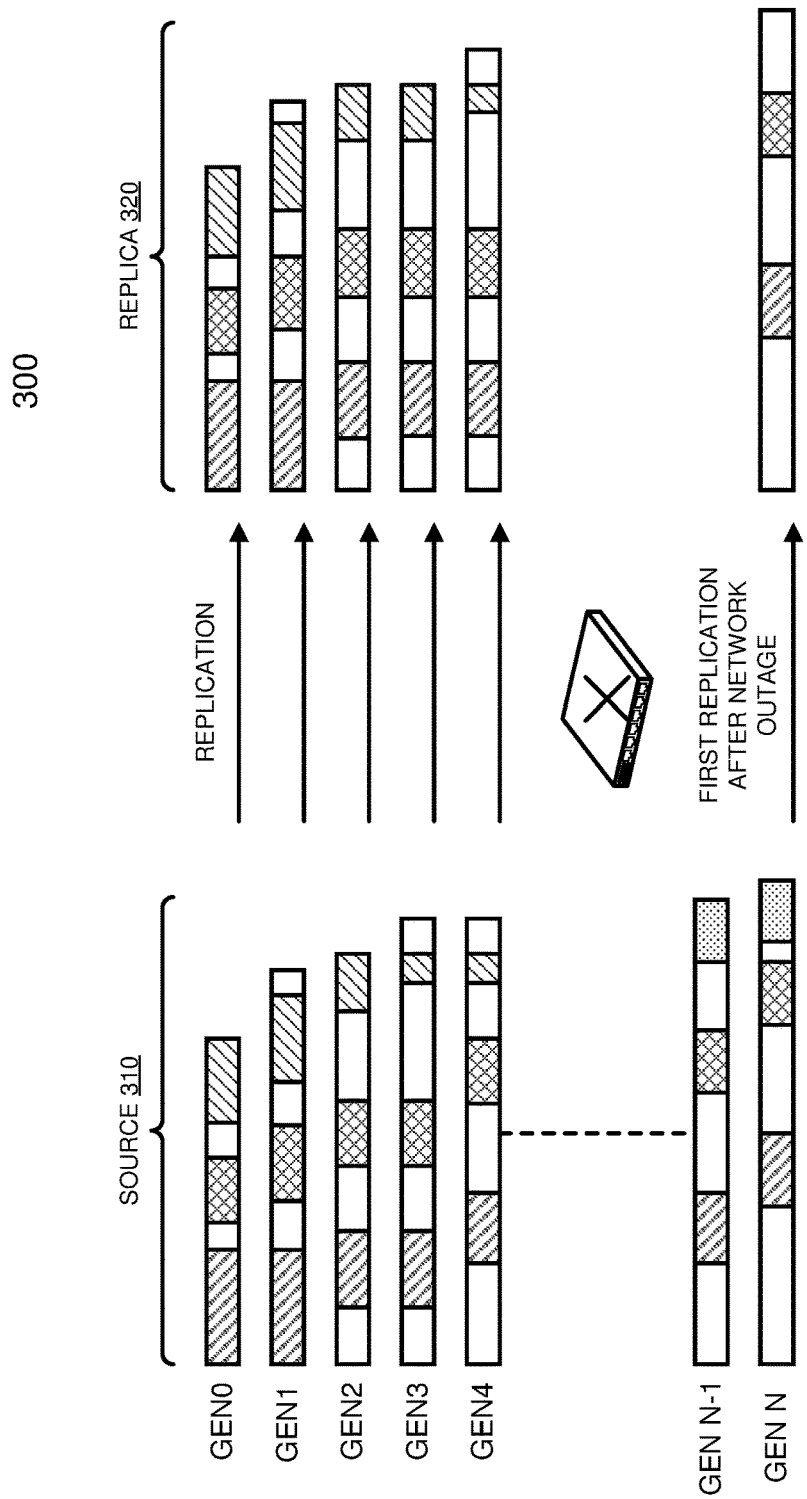
FIG. 3 is a diagram illustrating generation-to-generation replication of files of a common lineage that is interrupted after Gen3.

Referring to FIG. 3, a diagram 300 illustrating generation-to-generation replication of files of a common lineage that is interrupted after Gen3 is shown. As with FIG. 2, common regions of data across generations are illustrated with shaded blocks, while the shading style indicates the inheritance relationship. The replication of files from the source file system 310 to the replica file system 320 is successful at every generation from Generation 0 (Gen0) up until Generation 3 (Gen3). However, at Generation 4 (Gen4), a network outage prevents further replication from being carried out. By the time the network outage is resolved and the replication can resume, files on the source file system 310 have progressed to Generation N (GenN, where N may be greater than 4), while files on the replica file system 320 remain at Gen3. It should be appreciated from FIG. 3 that while the data represented by the rightmost shaded block at GenN at the source file system 310 may be synthesized from, e.g. data from GenN−1, it cannot be synthesized at the replica file system 320 because there is no inheritance relationship between this block of data and the data that is available at the replica file system 320 (i.e., data from Gen0 up to Gen3) at the resumption of the replication. As described above, it may be impractical and/or unnecessary to perform the generation-to-generation replication process from Gen4 up to GenN upon the resolution of the network outage and the resumption of the replication, and usually it is only GenN that is of interest.

To only replicate the current generation of files upon the resumption of the replication process while skipping over the intervening generations on the source file system since the outage and to also take advantage of the data transfer savings enabled by the base file relationship, the base file relationship between the current generation and the last successfully replicated generation is required. However, the base file relationship between the current generation and the last successfully replicated generation may not be directly available if the current generation is more than one generation after the last successfully replicated generation because, in some embodiments, the base file relationship may be stored persistently in the file system as a tuple relationship, and the tuple relationship only links a file to its immediate base file.

Figure 4:
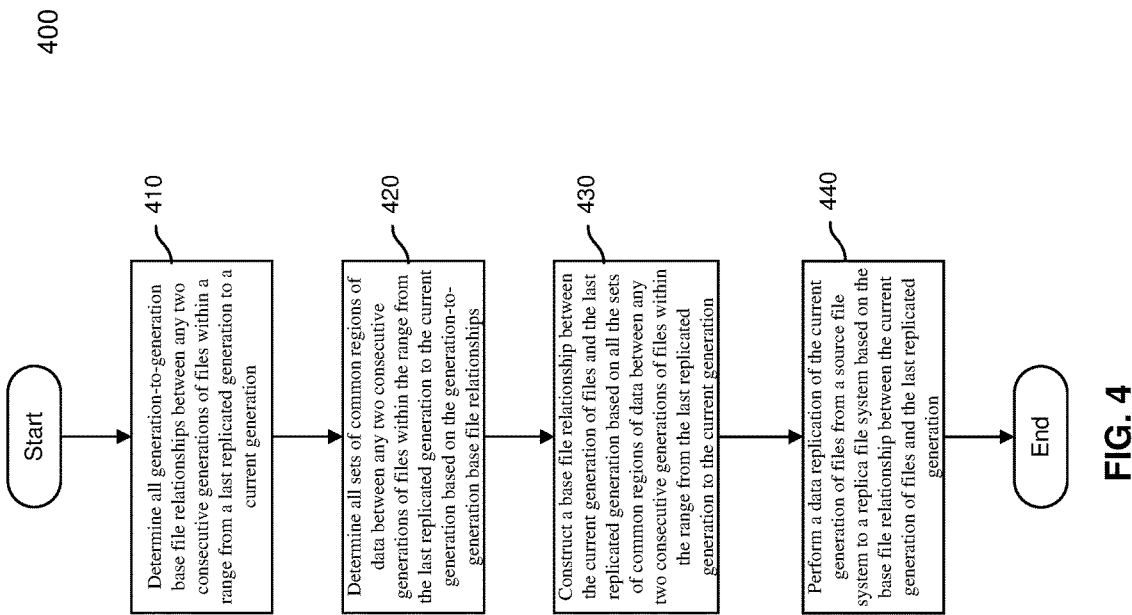
FIG. 4 is a flowchart illustrating a method for constructing the base file relationship between the current generation of files and the last replicated generation from the intervening generation-to-generation base file relationships.

Referring to FIG. 4, a flowchart illustrating a method 400 for constructing the base file relationship between the current generation of files and the last replicated generation from the intervening generation-to-generation base file relationships is shown. The current generation is more than one generation after the last replicated generation; otherwise the base file relationship is directly available. Each generation of files may comprise more than one file. One or more operations of the method 400 may be carried out at the source data storage system (e.g., the primary deduplication data storage system 104 of FIG. 1), at the replica data storage system (e.g., the secondary deduplication data storage system 106 of FIG. 1), at a device in communication with either the source data storage system or the replica data storage system, or by a combination of any of the abovementioned systems/devices collaboratively. Description of obvious flows of information between devices/systems may be omitted in order not to obscure the disclosure.

At block 410, all generation-to-generation base file relationships between any two consecutive generations of files within the range from the last replicated generation to the current generation may be determined. If any generation-to-generation base file relationship between any two consecutive generations within the range from the last replicated generation to the current generation is missing or otherwise not present, the base file relationship between the current generation of files and the last replicated generation cannot be constructed, and a regular replication of the current generation without the benefit of the base file relationship is to be carried out. For example, assuming the current generation is Generation N, and the last replicated generation is generation R, generation-to-generation base file relationships may be determined at block 410 for the following generation pairs (represented as generation index pairs within parentheses): (R, R+1), (R+1, R+2), . . . , (N−2, N−1), and (N−1, N).

At block 420, all sets of common regions of data between any two consecutive generations of files (e.g., inherited data from one generation to the next) within the range from the last replicated generation to the current generation may be determined based on the generation-to-generation base file relationships. For example, sets of common regions of data between the following generation pairs may be determined at block 420: (R, R+1), (R+1, R+2), . . . , (N−2, N−1), and (N−1, N).

At block 430, the base file relationship between the current generation of files and the last replicated generation may be constructed based on all the common regions of data between any two consecutive generations of files within the range from the last replicated generation to the current generation. In particular, the base file relationship between the current generation of files and the last replicated generation comprises the set of common regions of data between the current generation of files and the last replicated generation, and the set of the common regions of data between the current generation of files and the last replicated generation may be the intersection of all the sets of common regions of data between any two consecutive generations of files within the range from the last replicated generation to the current generation (the intersection of a plurality of sets is defined as the set of elements that belong simultaneously to all of the plurality of sets). For example, sets of data that are common to all the sets of common regions of data between the following generation pairs: (R, R+1), (R+1, R+2), . . . , (N−2, N−1), and (N−1, N), may be the set of the common regions of data between the current generation of files and the last replicated generation, and may be determined at block 430.

At block 440, a data replication of the current generation of files from the source file system to the replica file system may be performed based on the base file relationship between the current generation of files and the last replicated generation. The source file system may be located on a first deduplication data storage system (e.g., the primary deduplication data storage system 104 of FIG. 1), and the replica file system may be located on a second deduplication data storage system (e.g., the secondary deduplication data storage system 106 of FIG. 1). Because the common regions of data need not be transferred during replication while the base file relationship is leveraged, the amount of data that needs to be transferred is reduced.

Therefore, a base file relationship between the current generation of files and the last replicated generation may be constructed based on the generation-to-generation base file relationships of the intervening generations. The base file relationship between the current generation of files and the last replicated generation may be utilized in the replication of the current generation of files to the replica file system to reduce the amount of data that needs to be transferred while the files on the replica file system are more than one generation behind the current generation due to network outage or other issues.

Figure 5:
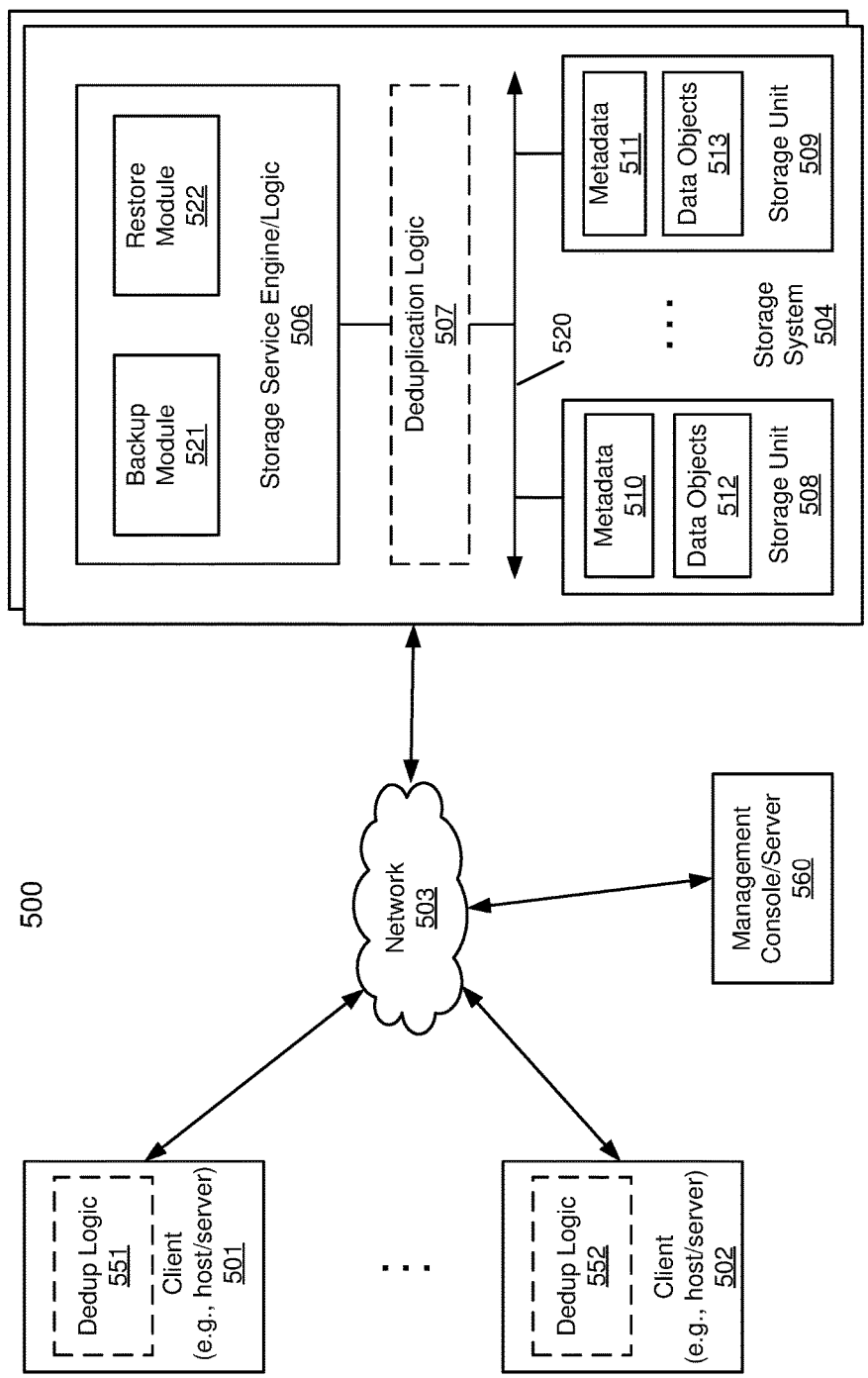
FIG. 5 is a block diagram illustrating a storage system according to one embodiment of the invention.

FIG. 5 is a block diagram illustrating a storage system according to one embodiment of the invention. Referring to FIG. 5, system 500 includes, but is not limited to, one or more client systems 501-502 communicatively coupled to storage system 504 over network 503. Clients 501-502 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 501-502 may be a primary storage system (e.g., local data center) that provides storage to other local clients, which may periodically back up the content stored therein to a backup storage system (e.g., a disaster recovery site or system), such as storage system 504. Network 503 may be any type of networks such as a local area network (LAN), a wide area network (WAN) such as the Internet, a fiber network, a storage network, or a combination thereof, wired or wireless. Clients 501-502 may be in physical proximity or may be physically remote from one another. Storage system 504 may be located in proximity to one, both, or neither of clients 501-502. In one embodiment, the primary deduplication data storage system 104 of FIG. 1 may correspond to either of the clients 501-502 of FIG. 5, and the secondary deduplication data storage system 106 of FIG. 1 may correspond to the storage system 504 of FIG. 5.

Storage system 504 may include or represent any type of servers or a cluster of one or more servers (e.g., cloud servers). For example, storage system 504 may be a storage server used for various different purposes, such as to provide multiple users or client systems with access to shared data and/or to back up (or restore) data (e.g., mission critical data). Storage system 504 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 504 may further provide storage services via an object-based protocol and Hadoop distributed file system (HDFS) protocol.

In one embodiment, storage system 504 includes, but is not limited to, storage service engine 506 (also referred to as service logic, service module, or service unit, which may be implemented in software, hardware, or a combination thereof), optional deduplication logic 507, and one or more storage units or devices 508-509 communicatively coupled to each other. Storage service engine 506 may represent any storage service related components configured or adapted to provide storage services (e.g., storage as a service) to a variety of clients using any of the access protocols set forth above. For example, storage service engine 506 may include backup logic 521 and restore logic 522. Backup logic 521 is configured to receive and back up data from a client (e.g., clients 501-502) and to store the backup data in any one or more of storage units 508-509. Restore logic 522 is configured to retrieve and restore backup data from any one or more of storage units 508-509 back to a client (e.g., clients 501-502).

Storage units 508-509 may be implemented locally (e.g., single node operating environment) or remotely (e.g., multi-node operating environment) via interconnect 520, which may be a bus and/or a network (e.g., a storage network or a network similar to network 503). In one embodiment, storage units 508-509 stores, but is not limited to, metadata 510-511 and data objects 512-513. Storage units 508-509 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 508-509 may be located locally or remotely accessible over a network.

In response to a data file to be stored in storage units 508-509, according to one embodiment, deduplication logic 507 is configured to segment the data file into multiple segments (also referred to as chunks) according to a variety of segmentation policies or rules. Deduplication logic 507 may choose not to store a segment in a storage unit if the segment has been previously stored in the storage unit. In the event that deduplication logic 507 chooses not to store the segment in the storage unit, it stores metadata enabling the reconstruction of the file using the previously stored segment. As a result, segments of data files are stored in a deduplicated manner, either within each of storage units 508-509 or across at least some of storage units 508-509. The metadata, such as metadata 510-511, may be stored in at least some of storage units 508-509, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 507 is to maintain only a single copy of each unique set of data within a data set. To achieve that goal, deduplication logic 507 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 507 identifies data blocks that can potentially be deduplicated by comparing digests of data blocks with list of digests stored in the index table. Further, when data blocks are deduplicated after comparing digest information, deduplication logic 507 updates metadata of deduplicated data blocks. Additionally, deduplication logic 507 updates metadata of a data block when the data block is reduplicated.

In one embodiment, referring back to FIG. 5, any of clients 501-502 may further include an optional deduplication logic (e.g., deduplication logic 551-552) having at least a portion of functionalities of deduplication logic 507. Deduplication logic 551-552 are configured to perform local deduplication operations, respectively. For example, prior to transmit data to storage system 504, each of the deduplication logic 551-552 may deduplicate the data into deduplicated segments and determine whether a particular deduplicated segment has already been stored in storage system 504. A deduplicated segment is transmitted to storage system 504 only if the deduplicated segment has not been stored in storage system 504.

For example, when client 501 is about to transmit a data stream (e.g., a file or a directory of one or more files) to storage system 504, deduplication logic 551 is configured to deduplicate the data stream into deduplicated segments. For each of the deduplicated segments, client 501 transmits a fingerprint or representative of the deduplicated segment to storage system 504 to determine whether that particular deduplicated segment has already been stored in storage system 504. A deduplicated segment that has been stored in storage system 504 may be previously received from the same client 501 or from another client such as client 502. In response to a response from storage system 504 indicating that the segment has not been stored in storage system 504, that particular segment is then transmitted over to the storage system 504. As a result, the network traffic or bandwidth and the processing resources required can be greatly reduced.

Note that some or all of the components as shown and described above in FIG. 5 may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
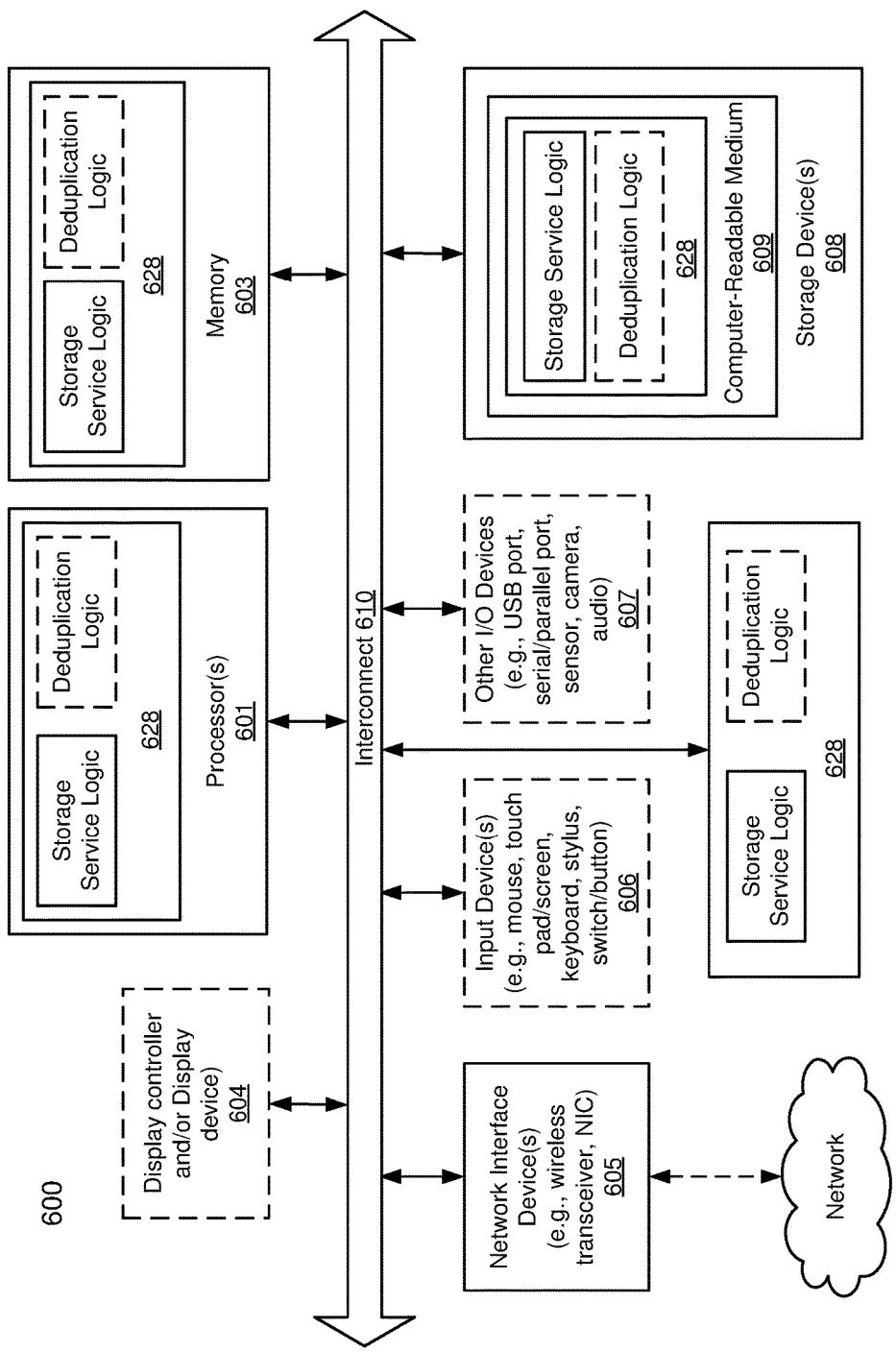
FIG. 6 is a block diagram illustrating an example of a data processing system which may be used with one embodiment of the disclosure.

FIG. 6 is a block diagram illustrating an example of a data processing system which may be used with one embodiment of the disclosure. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 607. Network interface device 605 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic 628) embodying any one or more of the methodologies or functions described herein. Module/unit/logic 628 may also reside, completely or at least partially, within memory 603 and/or within processor 601 during execution thereof by data processing system 600, memory 603 and processor 601 also constituting machine-accessible storage media. Module/unit/logic 628 may further be transmitted or received over a network via network interface device 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Module/unit/logic 628, components and other features described herein can be implemented as discrete hardware components or integrated in the functionality of hardware components such as ASICS, FPGAs, DSPs or similar devices. In addition, module/unit/logic 628 can be implemented as firmware or functional circuitry within hardware devices. Further, module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method, comprising:
   subsequent to creation of a current generation of files, determining all generation-to-generation base file relationships between any two consecutive generations of files within a range from a last replicated generation to the current generation;
   subsequent to creation of a current generation of files, determining all sets of common regions of data between any two consecutive generations of files within the range from the last replicated generation to the current generation based on the generation-to-generation base file relationships;
   subsequent to creation of the current generation of files, constructing a base file relationship between the current generation of files and the last replicated generation based on all the sets of common regions of data between any two consecutive generations of files within the range from the last replicated generation to the current generation; and
   performing a data replication of the current generation of files from a source file system to a replica file system based on the base file relationship between the current generation of files and the last replicated generation without replicating intervening generations of files between the current generation and the last replicated generation.

2. The method of claim 1, wherein the current generation of files is more than one generation after the last replicated generation.

3. The method of claim 1, wherein the base file relationship between the current generation of files and the last replicated generation comprises a set of common regions of data between the current generation of files and the last replicated generation.

4. The method of claim 3, wherein the set of common regions of data between the current generation of files and the last replicated generation is an intersection of all the sets of common regions of data between any two consecutive generations of files within the range from the last replicated generation to the current generation.

5. The method of claim 4, wherein the set of common regions of data between the current generation of files and the last replicated generation is not transferred from source file system to the replica file system during the data replication of the current generation of files.

6. The method of claim 1, wherein each generation of files comprises more than one files.

7. The method of claim 1, wherein the source file system is located on a first deduplication data storage system, and the replica file system is located on a second deduplication data storage system.

8. A data storage system, comprising:
   a memory; and
   a processor coupled to the memory or other data storage device and configured to:
   subsequent to creation of a current generation of files, determine all generation-to-generation base file relationships between any two consecutive generations of files within a range from a last replicated generation to the current generation;
   subsequent to creation of the current generation of files, determine all sets of common regions of data between any two consecutive generations of files within the range from the last replicated generation to the current generation based on the generation-to-generation base file relationships;
   subsequent to creation of the current generation of files, construct a base file relationship between the current generation of files and the last replicated generation based on all the sets of common regions of data between any two consecutive generations of files within the range from the last replicated generation to the current generation; and
   perform a data replication of the current generation of files from a source file system to a replica file system based on the base file relationship between the current generation of files and the last replicated generation without replicating intervening generations of files between the current generation and the last replicated generation.

9. The system of claim 8, wherein the current generation of files is more than one generation after the last replicated generation.

10. The system of claim 8, wherein the base file relationship between the current generation of files and the last replicated generation comprises a set of common regions of data between the current generation of files and the last replicated generation.

11. The system of claim 10, wherein the set of common regions of data between the current generation of files and the last replicated generation is an intersection of all the sets of common regions of data between any two consecutive generations of files within the range from the last replicated generation to the current generation.

12. The system of claim 11, wherein the set of common regions of data between the current generation of files and the last replicated generation is not transferred from source file system to the replica file system during the data replication of the current generation of files.

13. The system of claim 8, wherein each generation of files comprises more than one files.

14. The system of claim 8, wherein the source file system is located on a first deduplication data storage system, and the replica file system is located on a second deduplication data storage system.

15. A non-transitory computer-readable medium having instructions stored therein which, when executed by processor, cause the processor to perform operations, the operations comprising:
- subsequent to creation of a current generation of files, determining all generation-to-generation base file relationships between any two consecutive generations of files within a range from a last replicated generation to the current generation;
- subsequent to creation of the current generation of files, determining all sets of common regions of data between any two consecutive generations of files within the range from the last replicated generation to the current generation based on the generation-to-generation base file relationships;
- subsequent to creation of a current generation of files, constructing a base file relationship between the current generation of files and the last replicated generation based on all the sets of common regions of data between any two consecutive generations of files within the range from the last replicated generation to the current generation; and
- performing a data replication of the current generation of files from a source file system to a replica file system based on the base file relationship between the current generation of files and the last replicated generation without replicating intervening generations of files between the current generation and the last replicated generation.

16. The non-transitory computer-readable medium of claim 15, wherein the current generation of files is more than one generation after the last replicated generation.

17. The non-transitory computer-readable medium of claim 15, wherein the base file relationship between the current generation of files and the last replicated generation comprises a set of common regions of data between the current generation of files and the last replicated generation.

18. The non-transitory computer-readable medium of claim 17, wherein the set of common regions of data between the current generation of files and the last replicated generation is an intersection of all the sets of common regions of data between any two consecutive generations of files within the range from the last replicated generation to the current generation.

19. The non-transitory computer-readable medium of claim 18, wherein the set of common regions of data between the current generation of files and the last replicated generation is not transferred from source file system to the replica file system during the data replication of the current generation of files.

20. The non-transitory computer-readable medium of claim 15, wherein each generation of files comprises more than one files.

21. The non-transitory computer-readable medium of claim 15, wherein the source file system is located on a first deduplication data storage system, and the replica file system is located on a second deduplication data storage system.

* * * * *